(12) United States Patent
Dewar et al.

(10) Patent No.: US 8,943,064 B2
(45) Date of Patent: Jan. 27, 2015

(54) USING ORGANIZATIONAL AWARENESS IN LOCATING BUSINESS INTELLIGENCE

(75) Inventors: David Dewar, Manotick (CA); Jason Hiltz-Laforge, Ottawa (CA); Matthew J. Postle-Hacon, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/185,175

(22) Filed: Jul. 18, 2011

(65) Prior Publication Data

US 2012/0109880 A1 May 3, 2012

(30) Foreign Application Priority Data

Oct. 29, 2010 (CA) ........................................ 2718701

(51) Int. Cl.
G06F 7/00 (2006.01)
G06F 17/30 (2006.01)
G06Q 30/02 (2012.01)

(52) U.S. Cl.
CPC ........................................ *G06Q 30/02* (2013.01)
USPC ........................... 707/739; 707/737; 707/736

(58) Field of Classification Search
None
See application file for complete search history.

(56) References Cited

U.S. PATENT DOCUMENTS

| | | | |
|---|---|---|---|
| 7,523,137 B2 | 4/2009 | Kass et al. | |
| 7,620,647 B2 | 11/2009 | Stephens et al. | |
| 7,636,709 B1 | 12/2009 | Srikant et al. | |
| 7,644,052 B1* | 1/2010 | Chang et al. | 706/45 |
| 7,694,311 B2 | 4/2010 | Amir et al. | |
| 7,747,651 B2 | 6/2010 | Potter et al. | |
| 8,015,037 B2* | 9/2011 | Serio | 705/4 |
| 2005/0108200 A1* | 5/2005 | Meik et al. | 707/3 |
| 2007/0239508 A1 | 10/2007 | Fazal et al. | |
| 2008/0071818 A1* | 3/2008 | Apanowicz et al. | 707/101 |
| 2009/0077008 A1 | 3/2009 | Francis | |
| 2009/0144780 A1* | 6/2009 | Toebes et al. | 725/87 |
| 2009/0164508 A1 | 6/2009 | Legault et al. | |
| 2009/0248651 A1 | 10/2009 | Perry et al. | |
| 2009/0282045 A1 | 11/2009 | Hsieh et al. | |
| 2011/0055771 A1* | 3/2011 | Chen et al. | 715/854 |

FOREIGN PATENT DOCUMENTS

| | | |
|---|---|---|
| CA | 2524524 A1 | 2/2001 |
| CA | 2699669 A1 | 3/2009 |
| WO | 2004095337 A1 | 11/2004 |
| WO | 2010109331 A1 | 9/2010 |

* cited by examiner

*Primary Examiner* — Fred I Ehichioya
*Assistant Examiner* — Jau-Shya Meng
(74) *Attorney, Agent, or Firm* — Shumaker & Sieffert, P.A.

(57) ABSTRACT

An illustrative embodiment of a computer-implemented method for using organizational awareness in locating business intelligence receives an identity of an individual in an organizational hierarchy of users to form an identified individual and identifies people related to the identified individual in the organizational hierarchy of users using a people information database and relationship criteria to form related people. The computer-implemented method further identifies documents associated with the related people to form identified documents, inspects gathered information of the identified documents using a subset of relationship criteria to form inspected information and creates a list of suggested documents based at least on the inspected information.

17 Claims, 4 Drawing Sheets

USING ORGANIZATIONAL AWARENESS IN LOCATING BUSINESS INTELLIGENCE

BACKGROUND

1. Technical Field

This disclosure relates generally to data mining in a data processing system.

2. Description of the Related Art

Business intelligence systems are in a unique position to mine important information and present the mined information to a user to enable the user to become a more effective decision maker. Typical data mining applications analyze data for anomalies and other relevant information.

In one example of data mining, an analysis of shopping activity is performed. The shopping activity analysis provides a market basket analysis to determine when people buy eggs, and what else is purchased at that time. The analysis is typically performed using individual transaction records to find associations between items in transactions and to produce a predetermined confidence level.

A synthesized result may be obtained for a combination of shoppers also buying eggs and other items however the shoppers are related by purchase transactions only.

BRIEF SUMMARY

According to one embodiment, a computer-implemented method to use organizational awareness in locating business intelligence receives an identity of an individual in an organizational hierarchy of users to form an identified individual and identifies people related to the identified individual in the organizational hierarchy of users using a people information database and relationship criteria to form related people. The computer-implemented method further identifies documents associated with the related people to form identified documents, inspects gathered information of the identified documents using a subset of relationship criteria to form inspected information and creates a list of suggested documents based at least on the inspected information.

According to another embodiment, a computer program product for using organizational awareness in locating business intelligence comprises a readable storage medium having computer readable program code embodied therewith. The computer readable program code comprises computer readable program code configured to receive an identity of an individual in an organizational hierarchy of users to form an identified individual, computer readable program code configured to identify people related to the identified individual in the organizational hierarchy of users using a people information database and relationship criteria to form related people, computer readable program code configured to identify documents associated with the related people to form identified documents, computer readable program code configured to inspect gathered information of the identified documents using a subset of relationship criteria to form inspected information and computer readable program code configured to create a list of suggested documents based at least on the inspected information.

According to another embodiment, an apparatus for using organizational awareness in locating business intelligence comprises a communications fabric, a memory coupled to the communications fabric, wherein the memory contains computer readable program code, a communications unit coupled to the communications fabric, an input/output unit coupled to the communications fabric, a display coupled to the communications fabric and a processor unit coupled to the communications fabric. The processor unit executes the computer readable program code to direct the apparatus to receive an identity of an individual in an organizational hierarchy of users to form an identified individual, identify people related to the identified individual in the organizational hierarchy of users using a people information database and relationship criteria to form related people, identify documents associated with the related people to form identified documents, inspect gathered information of the identified documents using a subset of relationship criteria to form inspected information and create a list of suggested documents based at least on the inspected information.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be coupled to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
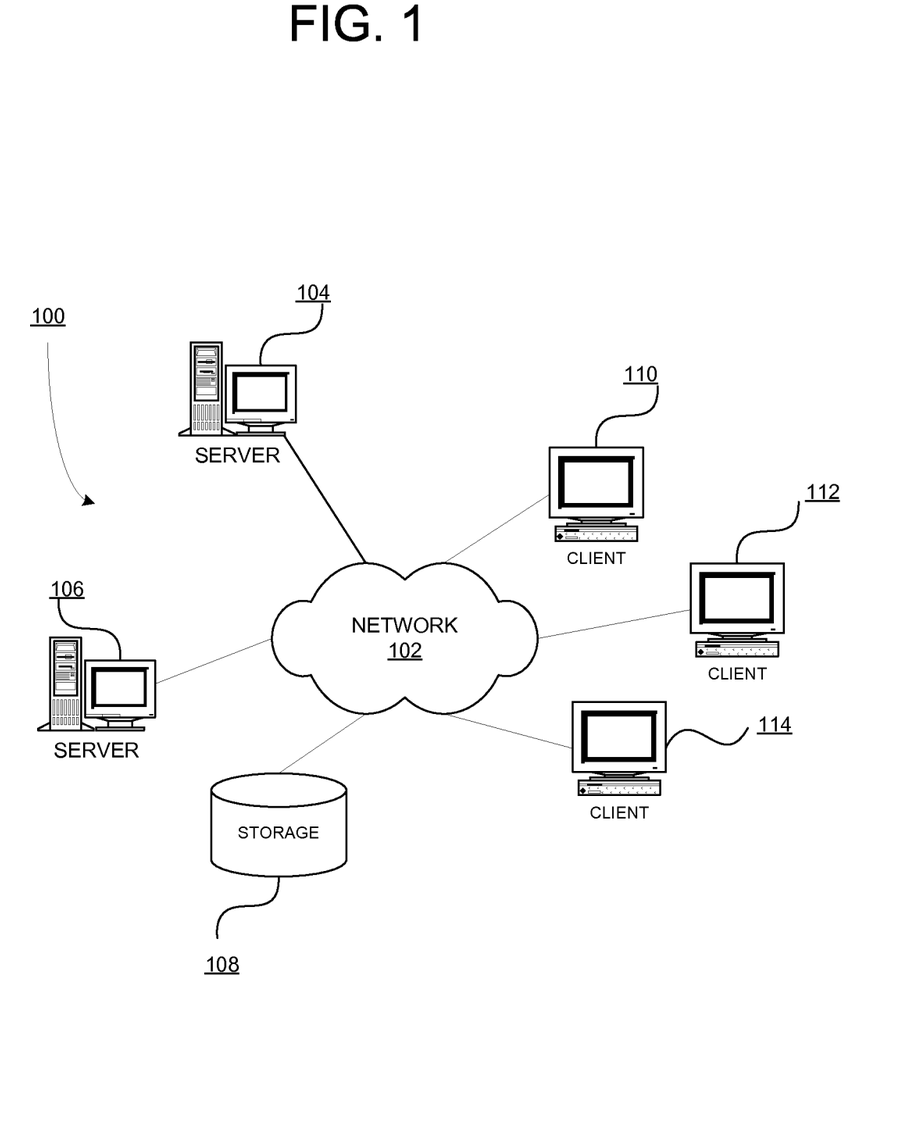
FIG. 1 is a block diagram of an example data processing system network operable for various embodiments of the disclosure.
Figure 2:
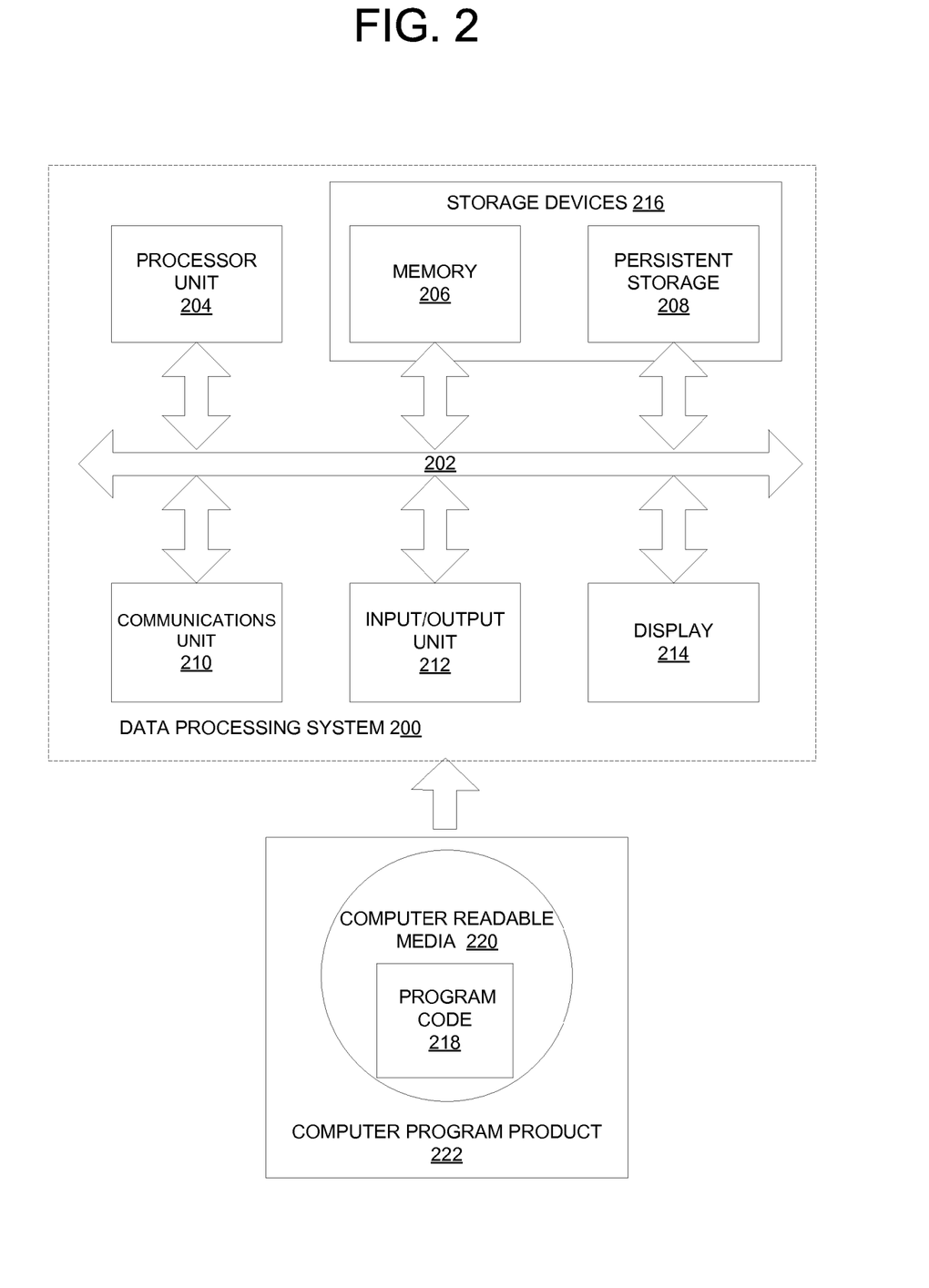
FIG. 2 is a block diagram of an example data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers coupled together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be coupled to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is coupled to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for using organizational awareness in locating business intelligence receives an identity of an individual in an organizational hierarchy of users to form an identified individual and identifies people related to the identified individual in the organizational hierarchy of users using a people information database and relationship criteria to form related people. The computer-implemented process further identifies documents associated with the related people to form identified documents, inspects gathered information using a subset of relationship criteria to form inspected information and creates a list of suggested documents.

Processor unit 204 receives an identity of an individual in an organizational hierarchy of users to form an identified individual through communication unit 210 or from storage devices 216. Processor unit 204 identifies people related to the identified individual in the organizational hierarchy of users using a people information database and relationship criteria to form related people maintained in storage devices 216. Processor unit 204 further identifies documents associated with the related people to form identified documents, inspects gathered information using a subset of relationship criteria to form inspected information and creates a list of suggested documents.

In another example, a computer-implemented process, using program code 218 stored in memory 206 or as a computer program product 222, for using organizational awareness in locating business intelligence comprises a computer recordable storage media, such as computer readable media 220, containing computer executable program code stored thereon. The computer executable program code comprises computer executable program code for detecting code breakage using source code change history.

In another illustrative embodiment, the process for using organizational awareness in locating business intelligence may be implemented in an apparatus comprising a communications fabric, a memory coupled to the communications fabric, wherein the memory contains computer executable program code, a communications unit coupled to the communications fabric, an input/output unit coupled to the communications fabric, a display coupled to the communications fabric, and a processor unit coupled to the communications fabric. The processor unit of the apparatus executes the computer executable program code to direct the apparatus to perform the process for using organizational awareness in locating business intelligence.

Figure 3:
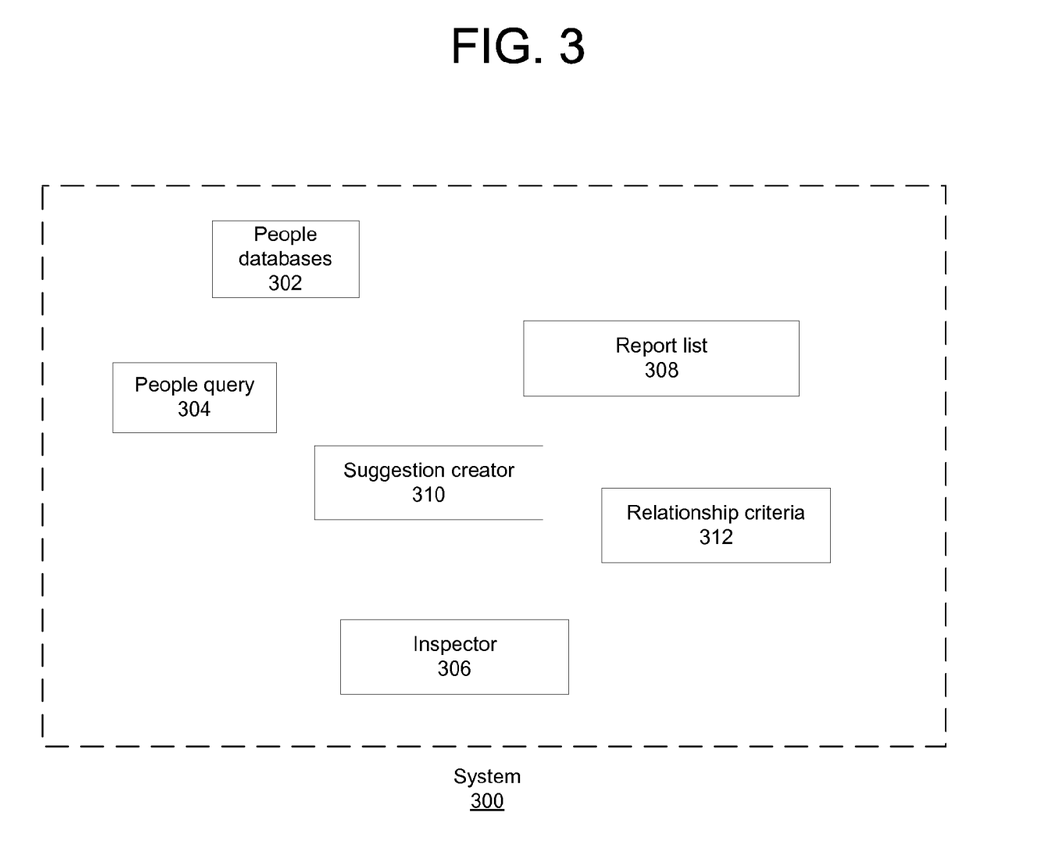
FIG. 3 is a block diagram of a system for using organizational awareness in locating business intelligence, in accordance with one embodiment of the disclosure.

With reference to FIG. 3, a block diagram of a system, in accordance with various embodiments of the disclosure is presented. System 300 is an example of a system using organizational awareness in locating business intelligence.

System 300 is based on a data processing system, for example, data processing system 200 of FIG. 2 for underlying services and is comprised of a number of components including people databases 302, people query 304, inspector 306, report list 308, suggestion creator 310 and relationship criteria 312. The components may be implemented as separate units or in combinations as needed without altering the capability of the disclosed process.

System 300 provides a capability to use an organizational structure to find business intelligence information and database query information based on usage of related people in a system (for example relations defined as superior, peer, subordinate).

System 300 does not provide a people you might know also feature. System 300 is targeted towards a group of related people where the relationships are actively managed by a business. For example when system 300 identifies a manager of an individual, and has identified a same report being used three times a week by that manager, and the individual has access to but never reviewed the report system 300 has a capability to suggest to the report be reviewed by the individual.

People databases 302 is a set of one or more databases containing information stored in a number of systems about groups of people and assigned roles of the people in an organization. For example, people databases 302 may be typical systems such as human resources system that store organizational reporting structures as well as personal information for individuals working in an enterprise. People databases 302 may be provided by enterprises or vendors within and across enterprises wherein the databases rely on differing technologies and schema.

People query 304 is capable of using various people systems of people databases 302 in common use, plus new and custom systems that enterprises may use. A generic abstract people query component, such as people query 304 is used with pre-created plug-in extensions for common instances of people databases 302, plus an extension mechanism to adapt to any custom people query 304 provider. People query 304 deals with security aspects of querying potentially sensitive information associated with an organizational role and reporting relationship. People query 304 also uses relationship criteria 312 to identify linkages between an individual and other people in an organizational hierarchy.

Inspector 306 provides a capability to inspect or analyze data items in documents associated with individuals identified within people databases 302. Documents are a generic form of information items including reports used within the enterprise. The documents are associated with individuals and may not necessarily been used by an individual.

Report list 308 is a set of reports (documents) typically provided as a list of reports associated with individuals and as a list of reports suggested for individuals. Suggestion creator 310 provides a capability to produce suggested reports based on information obtained using inspector 306 to analyze data items in documents associated with individuals identified within people databases 302. Suggestion creator 310 uses relationship criteria 312 to filter and form associations among possible reports identified by inspector 306.

Relationship criteria 312 provide a set of definitions describing associations among data items, among people and among data items and people. For example, criteria includes a number of possible metrics comprising matching semantics, reference counts, data sources, and negative context.

Figure 4:
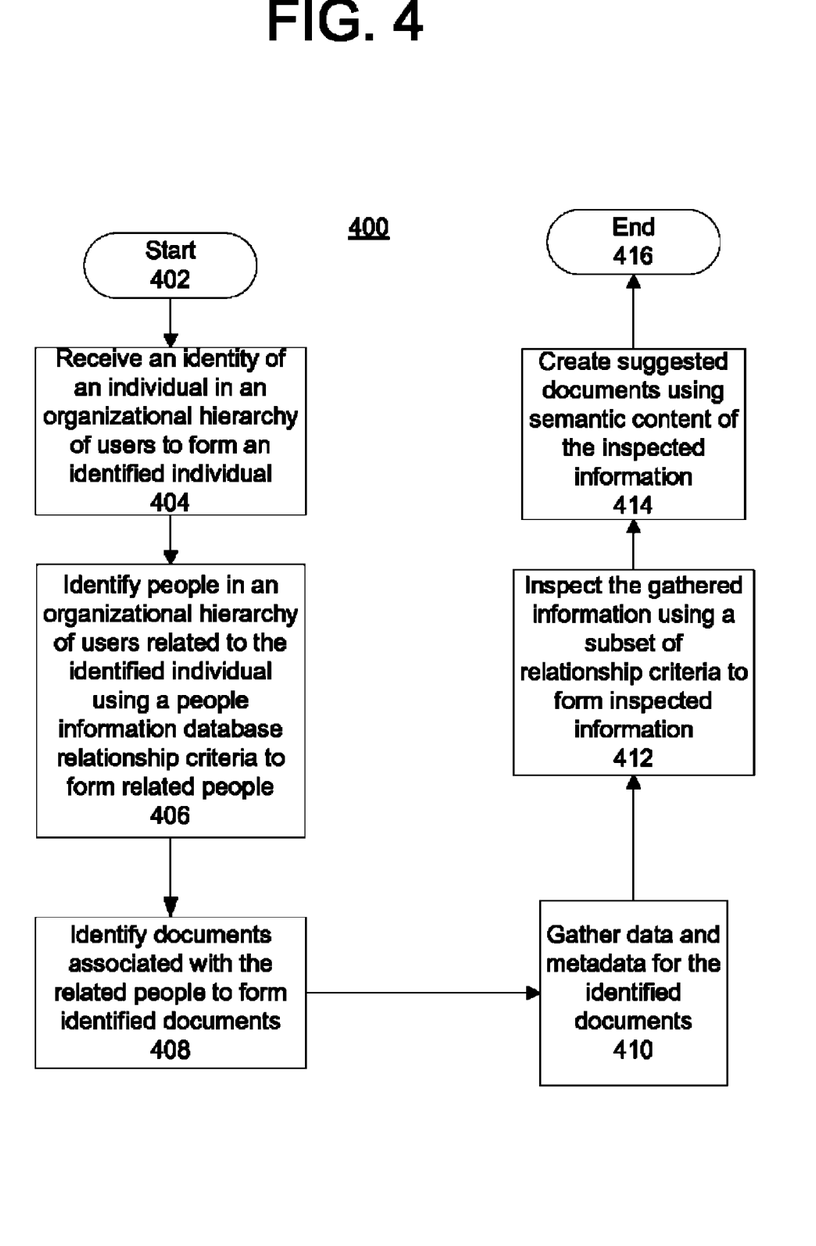
FIG. 4 is a flowchart of a process for using the system of FIG. 3, in accordance with one embodiment of the disclosure.

With reference to FIG. 4, a flowchart of a process, in accordance with one embodiment of the disclosure is presented. Process 400 is an example of a process using system 300 of FIG. 3.

Process 400 as described differs from a typical market basket analysis in that process 400 begins with a given person, finds people related to the given person (using a parameterized query), and finds documents used by the related people. Process 400 gathers data and metadata associated with the located documents and then suggests new documents based on the semantic content of the located documents.

Process 400 has a further capability to suggest new documents that none of the related people have used (by virtue of matching data and metadata in documents). For example, in a business intelligence system, reports outside a boundary are found by executing queries inside the boundary. The capability enables bringing rich valid sources of information that are out of a scope of a user into the scope of the user.

Process 400 provides a capability to mine information along a dimension of a business organization hierarchy. Organizational hierarchies are not new. Typical systems also look for various relationships among a list of users in social networking applications. Process 400 however aims to find and present new reports based on database queries based on usage in an organizational hierarchy of users.

Process 400 begins (act 402) and receives an identity of an individual to form an identified individual (act 404). The individual is a person of interest or target person for which suggested reports are desired. Process 400 identifies people related to the identified individual using a people information database and relationship criteria to form related people (act 406). Process 400 identifies related people by issuing a people query to a people information database to find and return a graph of people organizationally related to the current individual of interest. Related people are typically defined as individuals identified as superiors, peers and subordinates using ordinary organizational constructs.

Process 400 identifies documents used by the related people to form identified documents (act 408). Process 400 identifies the documents by performing another query to identify and obtain a list of reports each of the related people has seen. Seen in this case is a term that also means a person has access to rather than a limitation of only having physically looked at a document. Customizable parameters including a number of related users, closeness in a hierarchy of peers and superiors, and a time frame may also be used to filter a query. In addition to examining reports people have looked at, the system may analyze reports the identified individual owns, subscribes to or is on a distribution list for or reports, which the individual has scheduled for later execution. One mechanism used to obtain a list of reports is a query of audit logs, which track system usage.

Process 400 gathers data and metadata for the identified reports (documents) (act 410). Gathering may include examining references to data source query items defined in the reports in the system. For example, a report might have references to columns in database tables or dimensions in online analytical processing (OLAP) cubes. This definition of metadata could be broadened to refer to any metadata, for example, extensible markup language (XML) schemas with well-defined structure and semantics or analysis of ad hoc user defined tags.

Process 400 inspects the gathered information using a subset of relationship criteria to form inspected information (act 412). Information analyzed may include data items in a report definition, counting references to report and metadata items or placing report and metadata item references in hash maps. Inspection may be done at run time, or as stored information that is updated on a schedule.

Process 400 creates suggested documents (reports) using semantic content of inspected information (act 414) and terminates thereafter (act 416). For example, using an embodiment of process 400, a user is presented with a list of reports that other related individuals are using (boss, peers, subordinates) the user has not already seen. Process 400 provides a capability to offer these reports for use.

In another example using an embodiment of process 400, metadata query items in the reports are mined. Making use of database query metadata enables discovery of reports that none of the users in the organization have used, but share common metadata. For example, when a newly created report contains information on products. A user using an embodiment of process 400 may find this newly created report when users in the organizational sphere have looked at an existing report that contains product information.

Thus is provided in one embodiment a computer-implemented process for using organizational awareness in locating business intelligence receives an identity of an individual in an organizational hierarchy of users to form an identified individual and identifies people related to the identified individual in the organizational hierarchy of users using a people information database and relationship criteria to form related people. The computer-implemented process further identifies documents associated with the related people to form identified documents, inspects gathered information using a subset of relationship criteria to form inspected information and creates a list of suggested documents.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

One or more aspects of the disclosure can take the form of an entirely hardware embodiment, an entirely software embodiment or an embodiment containing both hardware and software elements. In a preferred embodiment, one or more aspects of the disclosure are implemented in software, which includes but is not limited to firmware, resident software, microcode, and other software media that may be recognized by one skilled in the art.

It is important to note that while techniques of the present disclosure have been described in the context of a fully functioning data processing system, those of ordinary skill in the art will appreciate that the processes of the present disclosure are capable of being distributed in the form of a computer readable medium of instructions and a variety of forms and that the present disclosure applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present disclosure has been presented for purposes of illustration and description, and is not intended to be exhaustive or limited to the embodiments in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer-implemented method to use organizational awareness in locating business intelligence, the computer-implemented method comprising:

receiving an identity of an individual in an organizational hierarchy of users to form an identified individual;

identifying, by a processor, people related to the identified individual in the organizational hierarchy of users using a people information database and relationship criteria to form related people, the relationship criteria including a set of definitions describing associations between data items of one or more documents, between people, and between a combination of the data items and the people, wherein the relationship criteria comprises one or more metrics comprising at least one of the following: matching semantics, reference counts, data sources, or a negative context;

identifying, by the processor, documents associated with the related people to form identified documents, wherein the identified documents include documents to which at least a portion of the related people has access;

gathering, by the processor, information for the identified documents, the information including respective data items for each of the identified documents and respective metadata for each of the identified documents to form gathered information, wherein the metadata includes semantics of ad hoc user defined tags;

analyzing, based on a subset of the relationship criteria, the gathered information to form inspected information, the inspected information including at least one of 1) the respective data items for at least one or more of the identified documents, 2) a number of references to data source query items defined in the at least one or more identified documents, or 3) a hash map of the references; and creating, based on semantic content of the inspected information, a list of suggested documents, wherein the list of suggested documents includes one or more of the identified documents not accessed by the identified individual.

2. The computer-implemented method of claim 1, wherein identifying people related to the identified individual using a people information database and relationship criteria to form related people further comprises:

issuing a people query to a people information database; and responsive to issuing the people query, receiving a graph of people organizationally related to the identified individual wherein related people include individuals identified as superiors, peers and subordinates using ordinary organizational constructs.

3. The computer-implemented method of claim 1, wherein inspecting gathered information of the identified documents using a subset of relationship criteria to form inspected information further comprises:

executing the inspection at one of a run time and as stored information updated on a schedule.

4. The computer-implemented method of claim 1, wherein analyzing the gathered information further comprises:

examining references to data source query items defined in reports in a system wherein the references comprise references to dimensions in online analytical processing (OLAP) cubes.

5. The computer-implemented method of claim 1, wherein analyzing the gathered information further comprises:

inspecting information including the data items in the report definition, counting references to report and metadata items, and placing the report and metadata item references in hash maps.

6. The computer-implemented method of claim 1, wherein analyzing the gathered information further comprises:

mining metadata query items in the reports.

7. A computer program product for using organizational awareness in locating business intelligence, the computer program product comprising:

a non-transitory computer readable storage medium having computer readable program code embodied therewith, when executed by one or more processors, causes the one or more processors to:

receive an identity of an individual in an organizational hierarchy of users to form an identified individual;

identify people related to the identified individual in the organizational hierarchy of users using a people information database and relationship criteria to form related people, the relationship criteria including a set of definitions describing associations between data items of one or more documents, between people, and between a combination of the data items and the people, wherein the relationship criteria comprises one or more metrics comprising at least one of the following: matching semantics, reference counts, data sources, or a negative context;

identify documents associated with the related people to form identified documents, wherein the identified documents include documents to which at least a portion of the related people has access;

gather information for the identified documents, the information including respective data items for each of the identified documents and respective metadata for each of the identified documents to form gathered information, wherein the metadata includes semantics of ad hoc user defined tags;

analyze, based on a subset of the relationship criteria, the gathered information to form inspected information, the inspected information including at least one of 1) the respective data items for at least one or more of the identified documents, 2) a number of references to data source query items defined in the at least one or more identified documents, or 3) a hash map of the references; and create, based on semantic content of the inspected information, a list of suggested documents, wherein the list of suggested documents includes one or more of the identified documents not accessed by the identified individual.

8. The computer program product of claim 7, wherein the computer readable program code that causes the one or more processors to identify people related to the identified individual using a people information database and relationship criteria to form related people, when executed, further causes the one or more processors to:

issue a people query to a people information database; and responsive to issuing the people query, receive a graph of people organizationally related to the identified individual wherein related people include individuals identified as superiors, peers and subordinates using ordinary organizational constructs.

9. The computer program product of claim 7, wherein the computer readable program code that causes the one or more processors to analyze the gathered information, when executed, further causes the one or more processors to:

execute the inspection at one of a run time and as stored information updated on a schedule.

10. The computer program product of claim 7, wherein the computer readable program code that causes the one or more processors to analyze the gathered information, when executed, further causes the one or more processors to:

examine references to data source query items defined in reports in a system wherein the references comprise references to dimensions in online analytical processing (OLAP) cubes.

11. The computer program product of claim 7, wherein the computer readable program code that causes the one or more processors to analyze the gathered information, when executed, further causes the one or more processors to:

inspect information including the data items in the report definition, counting references to report and metadata items, and placing the report and metadata item references in hash maps.

12. The computer program product of claim 7, wherein the computer readable program code that causes the one or more processors to analyze the gathered information, when executed, further causes the one or more processors to:
mine metadata query items in the reports.

13. An apparatus to use organizational awareness in locating business intelligence, the apparatus comprising:
a communications fabric;
a memory coupled to the communications fabric, wherein the memory contains computer readable program code;
a communications unit coupled to the communications fabric;
an input/output unit coupled to the communications fabric;
a display coupled to the communications fabric; and
a processor unit coupled to the communications fabric, wherein the processor unit executes the computer readable program code to direct the apparatus to: receiving an identity of an individual in an organizational hierarchy of users to form an identified individual;
identifying, by a processor, people related to the identified individual in the organizational hierarchy of users using a people information database and relationship criteria to form related people, the relationship criteria including a set of definitions describing associations between data items of one or more documents, between people, and between a combination of the data items and the people, wherein the relationship criteria comprises one or more metrics comprising at least one of the following: matching semantics, reference counts, data sources, or a negative context;
identifying, by the processor, documents associated with the related people to form identified documents, wherein the identified documents include documents to which at least a portion of the related people has access;
gathering, by the processor, information for the identified documents, the information including respective data items for each of the identified documents and respective metadata for each of associated with the identified documents to form gathered information, wherein the metadata includes semantics of ad hoc user defined tags;
analyzing, based on a subset of the relationship criteria, the gathered information to form inspected information, the inspected information including at least one of 1) the respective data items for at least one or more of the identified documents, 2) a number of references to data source query items defined in the at least one or more identified documents, or 3) a hash map of the references; and
creating, based on semantic content of the inspected information, a list of suggested documents, wherein the list of suggested documents includes one or more of the identified documents not accessed by the identified individual.

14. The apparatus of claim 13 wherein the processor unit executes the computer readable program code to:
issue a people query to a people information database; and
responsive to issuing the people query, receive a graph of people organizationally related to the identified individual wherein related people include individuals identified as superiors, peers and subordinates using ordinary organizational constructs.

15. The apparatus of claim 13 wherein the processor unit executes the computer readable program code to:
execute the inspection at one of a run time, and as stored information updated on a schedule.

16. The apparatus of claim 13 wherein the processor unit executes the computer readable program code to:
examine references to data source query items defined in reports in a system wherein the references comprise references to dimensions in online analytical processing (OLAP) cubes.

17. The apparatus of claim 13 wherein the processor unit executes the computer readable program code to:
inspect information including the data items in the report definition, counting references to report and metadata items, and placing the report and metadata item references in hash maps.

* * * * *